No. 868,798. PATENTED OCT. 22, 1907.
R. McLAUGHLIN.
MEANS FOR OBTAINING POWER FROM FLOWING WATER.
APPLICATION FILED FEB. 20, 1905.
2 SHEETS—SHEET 1.
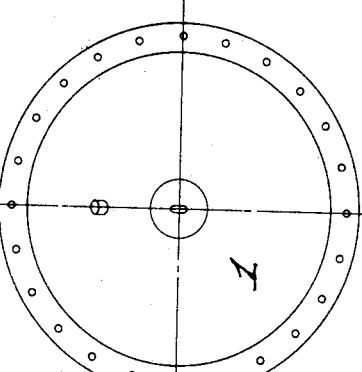
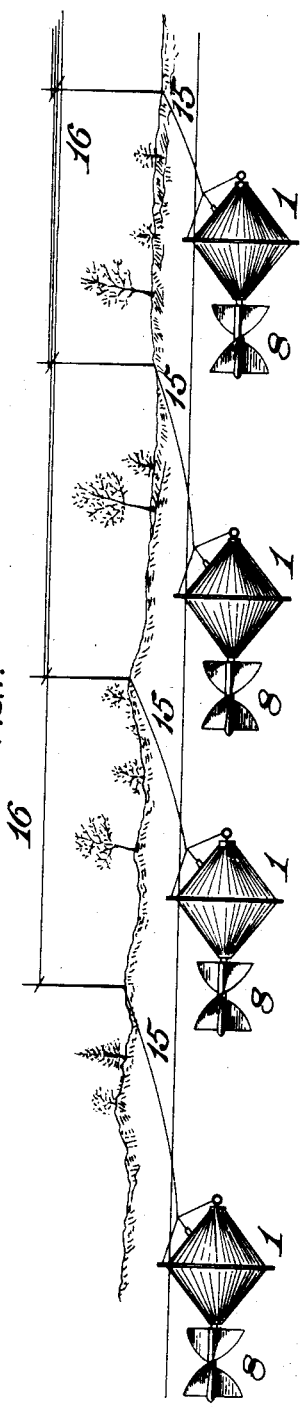
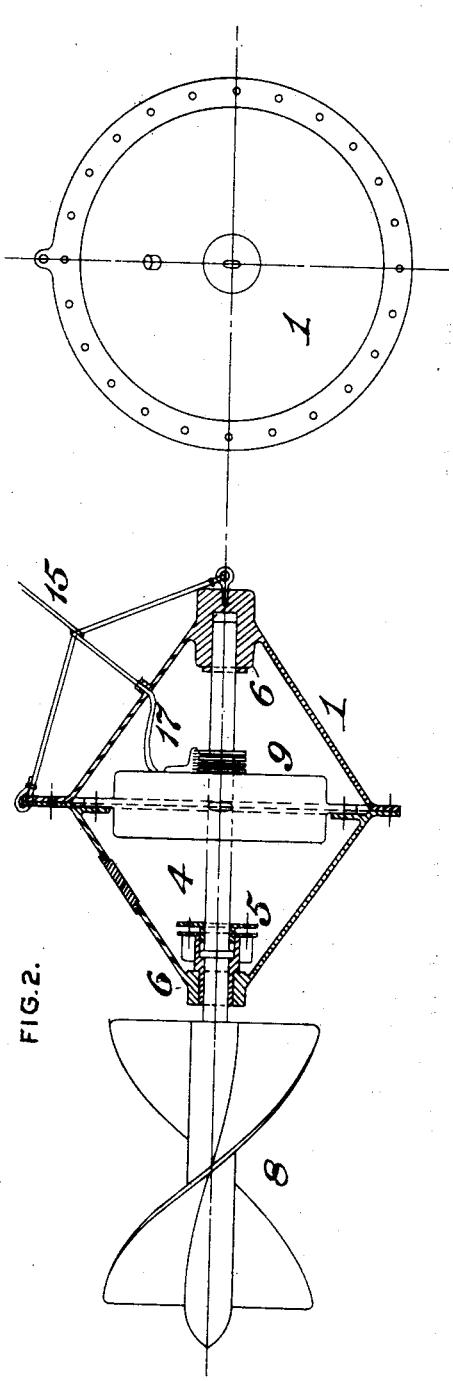
WITNESSES
James C. Herron.
S. R. Bell.
INVENTOR
Robert McLaughlin,
by Andrew Bell,
Att'y.

No. 868,798. PATENTED OCT. 22, 1907.
R. McLAUGHLIN.
MEANS FOR OBTAINING POWER FROM FLOWING WATER.
APPLICATION FILED FEB. 20, 1905.

2 SHEETS—SHEET 2.

UNITED STATES PATENT OFFICE.

ROBERT McLAUGHLIN, OF BALTIMORE, MARYLAND.

MEANS FOR OBTAINING POWER FROM FLOWING WATER.

No. 868,798.      Specification of Letters Patent.      Patented Oct. 22, 1907.

Application filed February 20, 1905. Serial No. 246,439.

*To all whom it may concern:*

Be it known that I, ROBERT MCLAUGHLIN, of the city of Baltimore, in the State of Maryland, have invented a certain new and useful Improvement in Means for Obtaining Power from Flowing Water, of which improvement the following is a specification.

My invention relates to motor apparatus of the general class or type in which power from the current of a rapidly flowing river or other body of water is utilized to impart rotation to a shaft journaled in bearings whose position is unaffected by the movement of the current, said shaft transmitting the applied power of the current to a driven mechanism.

The object of my invention is to provide an appliance of the above general type which shall be of simple and inexpensive construction, which may be readily installed and securely maintained in operative position, and by which the motive force of the flowing water may be effectively and economically utilized.

The improvement claimed is hereinafter fully set forth.

Figure 4:
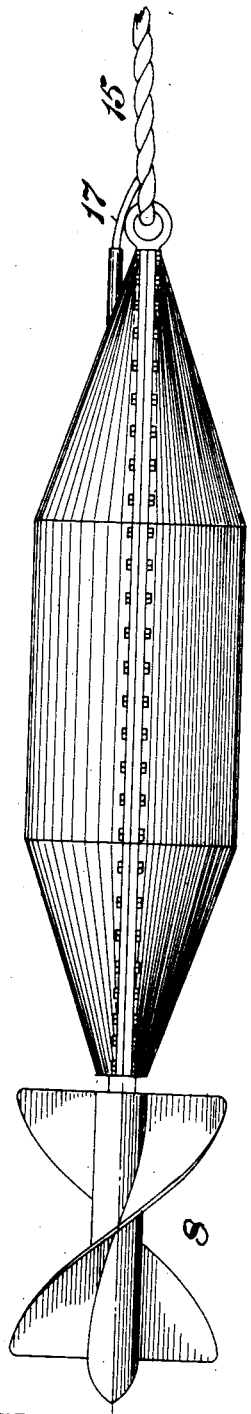
Figure 5:
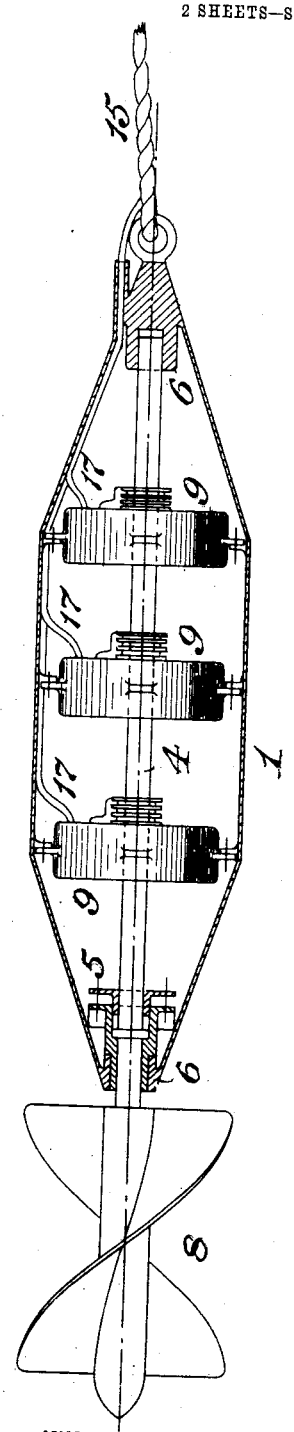

In the accompanying drawings: Figure 1, is a view, in elevation, of a plurality of current motor apparatuses illustrating a structural embodiment of my invention; Fig. 2, a vertical, longitudinal central section, on an enlarged scale, through one of the apparatuses of Fig. 1; Fig. 3, an end view of the same; Fig. 4, a side view, in elevation, of an apparatus substantially similar to those of Figs. 1 to 3 inclusive, but having a plurality of driven mechanisms; Fig. 5, a vertical, longitudinal central section through the same; and Fig. 6, an end view of the same.

The figures of the drawings illustrate a structural embodiment of my invention in which the supporting vessel, 1, is in the form of a water tight case, (a plurality of such vessels being shown in Fig. 1), which is moored or held in desired operative position by a cable or hawser, 15. A driving shaft, 4, extends longitudinally through the vessel and is journaled in end bearings 6 therein, as in the instance first described. As herein shown, the driving shaft passes through a stuffing box, 5, at one end of the vessel, and a screw propeller, 8, is fixed upon its outwardly projecting portion. It will, however, be obvious that if preferred, the opposite end of the driving shaft may also project outwardly and carry a screw propeller. The driven mechanism is in this instance shown as a dynamo, 9, which, is preferably "direct connected", its revolving element being mounted directly on the driving shaft, 4, and the current is conducted to a desired point, as to a connection with line wires, 15, by properly insulated conductors, 17, which pass through water tight fittings in the vessel, and are supported by the hawser which moors the vessel. In lieu of actuating a dynamo, the driving shaft may impart rotation, through gearing in the ordinary manner, to a flexible shaft constituting the driven member, said shaft being led, similarly to the conductors, 17, to a desired point of utilization on shore.

Figure 6:
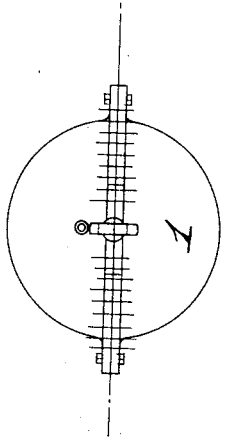

Figs. 4 to 6 inclusive illustrate a vessel which is longitudinally extended and provided with tapering or conical ends, in the general form of a torpedo, in order to afford sufficient space for the reception of a plurality of direct connected dynamos, from which current is transmitted as in the preceding instances. This construction enables the diameter of the vessel to be reduced so that it will divide the water easily and a better water way to the propeller will be afforded.

The apparatus shown in Figs. 1 to 6 inclusive may be employed for the purpose of generating electric current for use on board sailing vessels or vessels in tow which are not provided with motive power, by being towed by such vessel, the screw propeller being rotated by the movement of the vessel through the water, in the manner of a ship's log.

I claim as my invention and desire to secure by Letters Patent:

1. The combination of a water tight floatable vessel, a driving shaft extending longitudinally of said vessel, a screw propeller fixed on the driving shaft exterior to the vessel, a dynamo having its revolving elements fixed upon and rotating with the driving shaft, and electric conductors leading from the dynamo through a water tight fitting to a desired point of utilization of current.

2. The combination of a water tight floatable vessel having tapering or conical ends, a driving shaft extending longitudinally of said vessel, a screw propeller fixed on the driving shaft exterior to the vessel, a plurality of dynamos each having its revolving elements fixed upon and rotating with the driving shaft, and electric conductors leading from the several dynamos through a water tight fitting to a desired point of utilization of current.

ROBERT McLAUGHLIN.

Witnesses:
    FELIX R. SULLIVAN,
    R. CONTEE ROSE.